UNITED STATES PATENT OFFICE.

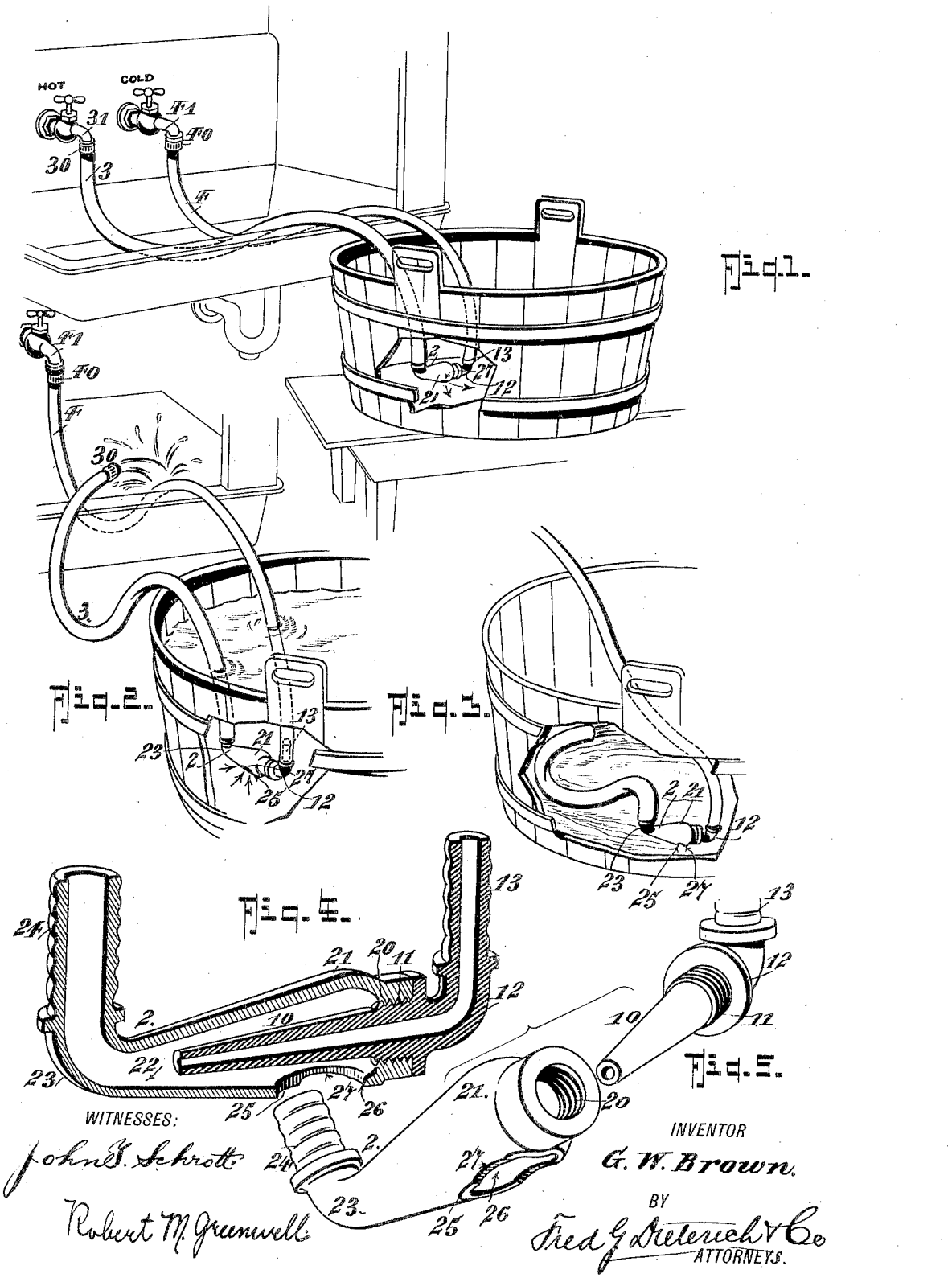

GEORGE W. BROWN, OF WALLACE, IDAHO.

APPLIANCE FOR EMPTYING TUBS, &c.

1,068,102.

Specification of Letters Patent.

Patented July 22, 1913.

Application filed March 5, 1912. Serial No. 681,761.

*To all whom it may concern:*

Be it known that I, GEORGE W. BROWN, residing at Wallace, in the county of Shoshone and State of Idaho, have invented a new and Improved Appliance for Emptying Tubs, &c., of which the following is a specification.

My invention has for its object to provide a simple, economical and effective household appliance especially useful for emptying washing machines, wash tubs and the like, and it comprehends a simple and improved form of hydraulic pumping means capable of being readily placed on the bottom in the tub or machine from which it is intended to remove the contents, and which is especially designed for being coupled with the common arrangement of hot and cold water spigots.

My invention is a device of the general character noted that embodies the peculiar and novel construction of parts hereinafter explained, specifically pointed out in the appended claims and illustrated in the accompanying drawing, in which:

Figure 1 is a perspective view that shows my invention as applied to a wash tub, and arranged for filling the same with hot or cold water. Fig. 2 is a similar view, my device being shown as arranged for removing the fluid contents of the tub. Fig. 3 is a like view that illustrates the manner in which my invention is arranged for rinsing the tub. Fig. 4 is a sectional perspective view of the device, the hose connections being omitted, and Fig. 5 is a similar view, the two parts that constitute the body of the device being separated.

My invention is designed to provide a convenient accessory to any family washing where water is supplied under pressure.

In its practical arrangement my invention comprises a two part body, one of which forms an inner nozzle, and the other, under certain conditions, an outer nozzle, the two being coupled together by threaded connections. The inner nozzle consists of a tapering nozzle 10 that terminates in an externally threaded end 11 formed with an elbow 12 and a vertically extended coupling nipple 13.

The outer nozzle 2 comprises an internally threaded hub like portion 20 that receives the threaded end 11 of the inner nozzle, a bulbular enlargement 21 that merges at the outer end in the hub 20 and which tapers to form a gradually contracting chamber 22, which merges with an elbow portion 23, that ends in a nipple 24, the diameter of which is somewhat larger than the diameter of the nipple 13 of the other member 1.

In the manufacture of my device, the members 1 and 2 are cast or otherwise formed and the said member 2 has a portion cut or ground down to an extent greater than the thickness of the shell that constitutes the said body 2, whereby to form a flattened surface hereinafter termed a bottom that forms a seat 25 for resting the device on the bottom of the tub or machine and for producing an elongated opening 26, for the free passage of the water into and out of the chamber 22, and to provide for an uninterrupted flow of the water in or out of the chamber 22, when the device is set flatwise on the tub bottom the said seat is finished with a transverse concavity 27, to provide lateral inlets or passages as shown.

For ordinary purposes, sections of garden hose 3—4, of suitable length, and having couplings 30—40 are coupled to the hot and cold water faucets 31 and 41, and their outer ends are slipped or coupled onto the nipples 24 and 13 of the members 2 and 1. When arranged as in Fig. 1, the, say ¾ inch diameter, hose 3 leads the hot water into the chambered body 2, while the smaller, say ½ inch hose 4 leads the cold water to the body 2, which mixes with the hot water and passes through the opening 26 to fill the tub to the point desired. When it is desired to remove the water from the tub, it is only necessary to disconnect the hose 3 from the hot water faucet and drop the free end of said hose connection into the sink as shown on Fig. 2, or into any sewer outlet, and then turn on the cold water, which now develops the device into a hydraulic or suction pump, since the cold water jet injected into the opposing member serves to quickly force the wash water from the tub through the ¾ inch hose to the sewer outlet without requiring the attendants lifting or handling the water in any way, and without spilling a drop of the said tub water on the floor. When the tubs are empty and it is desired to wash or rinse them out, it is only necessary to place the free end of the hose section 3 in the tub or machine until the required rinsing is done and then return the hose 3 to the sink or other sewer connection when the water is again completely drawn out of the tub or machine.

From the foregoing description taken in connection with the accompanying drawing, the complete operation and advantages of my invention will be readily apparent.

It should be stated that in the use of my invention, the disagreeable feature of handling the waste water in a pail or other means, which results in lifting and carrying the water, is avoided, and in consequence spilling and slopping the water on the floor is entirely overcome.

Having thus described my invention, what I claim is:—

1. An appliance of the character described, comprising a chambered body having a nipple at one end and restricted at the nipple end, an inner nozzle that extends into the said body, said inner nozzle having an inlet nipple, the chambered body having an opening at a point to the rear of the discharge end of the inner nozzle, and flexible tubing for joining the two nipples with hot and cold water spigots, each of said nipples extending in the same general direction and parallel to one another.

2. An appliance of the character described, comprising a two part body having threaded connections, one of the parts forming a tapering chamber having a nipple, the other forming an inner nozzle, said inner nozzle having a nipple inlet, the chambered portion having one face flattened and reduced to form a seat and a fluid passage, said opening being adjacent the inlet end of the inner nozzle, the said nipples being formed for receiving hose sections, whereby the appliance is connectible with hot and cold water spigots, each of said nipples extending in the same general direction and parallel to one another.

3. As a new article, a water delivering and discharging device for wash tubs and the like, comprising two sections having threaded connections, one of the said sections including a bulbular chamber of gradually decreasing diameter, and a hose receiving nipple at the reduced end of the said chamber and extending upwardly in a direction at right angles to the longitudinal axis of said sections, said chamber having its enlarged end reduced to form a flat seat provided with a fluid passage, the other section including a nipple portion also extending upwardly at right angles to the longitudinal axis of said sections and parallel to said first mentioned nipple for receiving a hose, and an inner nozzle that extends into the chamber of the other section to a point beyond the fluid passage and discharges into the reduced or nipple end of the said chamber.

4. As a new article, a water delivering and discharging device for wash tubs and the like, comprising two sections having threaded connections, one of the said sections including a bulbular chamber of gradually decreasing diameter, and a hose receiving nipple at the reduced end of the said chamber, said chamber having its enlarged end reduced to form a flat seat provided with a fluid passage, the other section including a nipple portion for receiving a hose and a nozzle that extends into the chamber of the other section to a point beyond the fluid passage and discharges into the reduced or nipple end of the said chamber, the said chamber also having transversely reduced portions that form side inlets for the fluid passage in the seat portion of the said chambered sections, said nipples extending upwardly in parallelism and in a direction at right angles to the longitudinal axis of said sections.

GEORGE W. BROWN.

Witnesses:
J. W. WIMER,
H. F. SLADE.